J. SPERRY
Manufacturing Boxes.

No. 8,481. Reissued Nov. 5, 1878

Attest:
H. H. Schott.
Fred E. Tasker.

Inventor:
John Sperry.
per
J. C. Tasker & Co. attys.

UNITED STATES PATENT OFFICE.

JOHN SPERRY, OF NEW YORK, N. Y.

IMPROVEMENT IN MANUFACTURING BOXES.

Specification forming part of Letters Patent No. 40,597, dated November 3, 1863; Reissue No. 8,481, dated November 5, 1878; application filed June 17, 1878.

DIVISION B.

*To all whom it may concern:*

Be it known that I, JOHN SPERRY, of New York city, in the county of New York and State of New York, have invented certain new and useful Improvements in Manufacturing Boxes; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Similar letters indicate corresponding parts in the different figures.

Figure 1:
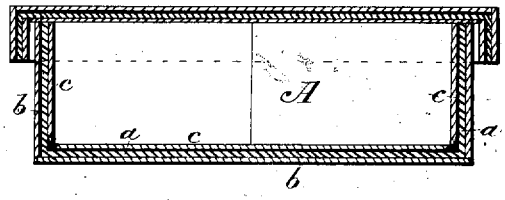
Figure 2:
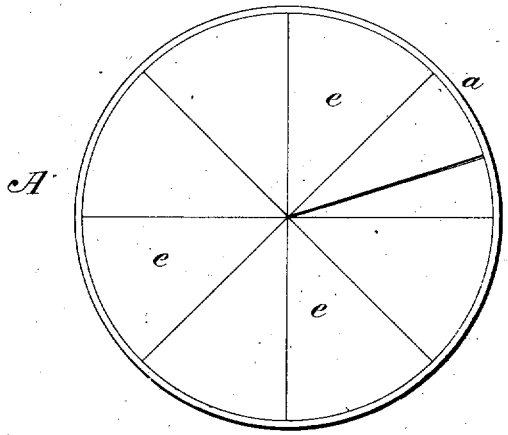

Figure 1 is a vertical section through the box and its cover, showing the arrangement of the several laminæ of veneers composing its structure. Fig. 2 is a plan exhibiting one method of cutting the veneer which forms the inner layer of the bottom of the package.

The object of this invention is to produce a grain-bound circular box or package by combining several thin layers of wood in such a manner that on every part of its body the grain of one layer shall run in a different way to that of the adjacent layer or layers; and the invention consists in the construction of a cylindrical box or package for the holding and transportation of merchandise by forming its body of thin layers of wood or veneer, the grain of the wood composing each of the several layers crossing at an angle to that of the adjacent layer or layers, and uniting the several layers together by means of glue, cement, or other equivalent means, as will be hereinafter fully set forth.

In the drawings, A represents a cylindrical box or package, the sides or body of which is composed of three layers of veneers, the central layer, *a*, being so placed that the grain of the wood composing it shall be nearly parallel with the longitudinal axis of the cylindrical box or package, while the grain of the wood composing the outer and inner layers, *b* and *c*, runs around the cylinders nearly at right angles to the grain of the layer *a*, the three layers being united by glue, cement, or equivalent means, thus forming the sides of a strong, cheap, and durable cylindrical package, capable of being applied to many of the uses now filled by more costly constructions. The cylindrical side walls or body of the box or package may be further strengthened by a band or hoop, which is fastened inside or outside; or two such bands may be applied, inside or outside, if desired.

The bottom of the box may be composed of a series of gores, *e*, which are produced by cutting out the end of the central layer, *a*, into a series of gores or points, which, after the sides have been formed, may be turned in so that their points meet in a common center, and fastened by one layer of wood, which may be applied inside or outside; or two such layers may be used, one inside and the other outside, and these layers are so placed that their grain runs in different directions.

It will be evident that a greater or less number of layers of veneers may be used, as the size and strength of the article manufactured may demand, the substance of my invention consisting in so placing the several layers that their grain shall always cross, thus giving strength to the structure.

Having thus described my invention, I claim as new, and desire to secure by Letters Patent, the following:

1. A cylindrical box or package the sides or body of which are composed of layers of wood so arranged in relation to each other that the grain of one layer crosses the grain of the adjacent layer, substantially as specified.

2. A cylindrical box or package the sides or body of which are composed of layers of wood so arranged in relation to each other that the grain of one layer crosses the grain of the adjacent layer, the several layers being united to each other by glue or cement, as and for the purpose set forth.

3. A cylindrical box or package, the sides or body of which are composed of layers of wood, the grain of one layer crossing the grain of the adjacent layer, and strengthened by bands or hoops placed inside or outside, and secured to the body, as set forth.

4. The bottom or end of a cylindrical box or package composed of layers of wood, the grain of one layer crossing the grain of the other, the middle layer being bent inwardly toward the center, to form one layer of the permanent end of the box, substantially as shown and described.

In testimony that I claim the foregoing I have hereunto set my hand this 30th day of May, 1878.

JOHN SPERRY.

Witnesses:
E. A. DICK,
JOHN C. TASKER.